United States Patent
Hong

(10) Patent No.: US 9,184,472 B2
(45) Date of Patent: Nov. 10, 2015

(54) BATTERY PACK AND METHOD OF MANUFACTURING BATTERY PACK WITH INTERCONNECTED HALF CONTACT PADS

(75) Inventor: Seongpyo Hong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 590 days.

(21) Appl. No.: 12/832,024

(22) Filed: Jul. 7, 2010

(65) Prior Publication Data

US 2011/0027622 A1 Feb. 3, 2011

(30) Foreign Application Priority Data

Jul. 28, 2009 (KR) .................. 10-2009-0068946

(51) Int. Cl.
*H01M 2/20* (2006.01)
*H01M 10/42* (2006.01)
*H01M 2/10* (2006.01)

(52) U.S. Cl.
CPC .......... *H01M 10/425* (2013.01); *H01M 2/1055* (2013.01); *H01M 2/204* (2013.01); *Y10T 29/53135* (2015.01)

(58) Field of Classification Search
None
See application file for complete search history.

(56) References Cited

U.S. PATENT DOCUMENTS

| 6,068,947 | A | * | 5/2000 | Tuttle | 429/158 |
| 2005/0217894 | A1 | * | 10/2005 | Pan | 174/260 |
| 2006/0019155 | A1 | * | 1/2006 | Seman et al. | 429/159 |
| 2007/0108254 | A1 | | 5/2007 | Kobayashi et al. | |
| 2008/0152993 | A1 | * | 6/2008 | Seiler et al. | 429/92 |
| 2009/0117458 | A1 | * | 5/2009 | Yun | 429/178 |

FOREIGN PATENT DOCUMENTS

| JP | 07-52377 | 6/1995 |
| JP | 2005-15883 | 6/2005 |
| KR | 10-2002-0086768 | 11/2002 |
| KR | 10-2008-0069503 | 7/2008 |
| KR | 10-2008-0090773 | 10/2008 |

\* cited by examiner

*Primary Examiner* — Ula C Ruddock
*Assistant Examiner* — Tony Chuo
(74) *Attorney, Agent, or Firm* — Knobbe Martens Olson & Bear LLP

(57) ABSTRACT

A method of manufacturing a battery pack of a plurality of bare cells is disclosed. The method comprises: preparing a protective circuit module comprising N pads, wherein each pad comprises a first half pad and a second half pad, N is a natural number greater than 1, the plurality of bare cells comprises M tabs, and M is a natural number equal to N; connecting first through $M^{th}$ tabs to the first half pads of first through $N^{th}$ pads, respectively; and electrically connecting the first half pads to the second half pads in a sequential order of potential.

9 Claims, 5 Drawing Sheets

US 9,184,472 B2

BATTERY PACK AND METHOD OF MANUFACTURING BATTERY PACK WITH INTERCONNECTED HALF CONTACT PADS

CROSS-REFERENCE TO RELATED APPLICATION

This application claims priority to and the benefit of Korean Patent Application No. 10-2009-0068946 filed on Jul. 28, 2009, the entire content of which is incorporated herein by reference.

BACKGROUND

1. Field

Embodiments relate to a battery pack and a method of manufacturing the battery pack.

2. Description of the Related Technology

A secondary battery may be commercialized with a single unit battery (single bare cell) or with an assembled battery including a plurality of unit batteries in a single pack, according to a relevant external device. The unit batteries of such an assembled battery are typically electrically connected to each other through a plurality of lead plates (or tabs) that are electrically connected to a protective circuit module.

When the lead plates are connected to the protective circuit module, the protective circuit module should be connected to the lead plates in order from a connection to a low potential terminal to a connection to a high potential terminal. Otherwise, the protective circuit module may become damaged by a floating phenomenon as known in the art.

SUMMARY

Embodiments are directed to a battery pack and a method of manufacturing the same that can substantially overcome one or more problems caused by limitations and disadvantages of the related art.

An embodiment comprises a battery pack, and a method of manufacturing the battery pack, which protects a protective circuit module and efficiently connects tabs to the protective circuit module.

At least one of the above features may be realized by providing a method of manufacturing a battery pack of a plurality of bare cells, the method comprising: preparing a protective circuit module comprising N pads, wherein each pad comprises a first half pad and a second half pad, N is a natural number that is greater than 1, the plurality of bare cells comprises M tabs, and M is a natural number equal to N; connecting first through $M^{th}$ tabs to the first half pads of first through Nth pads, respectively; and electrically connecting the first half pads to the second half pads in a sequential order of potential.

At least one of the above and other features and advantages may be realized by providing a battery pack comprising: a plurality of bare cells; and a protective circuit module electrically connected to the bare cells, wherein the protective circuit module includes N pads, wherein each pad comprises a first half pad and a second half pad, N is a natural number that is greater than 1, and the first half pad is electrically connected to the second half pad.

BRIEF DESCRIPTION OF THE DRAWINGS

The above and other features and advantages will become more apparent to those of ordinary skill in the art by describing in detail various embodiments with reference to corresponding drawings, in which.

DETAILED DESCRIPTION

Figure 1:
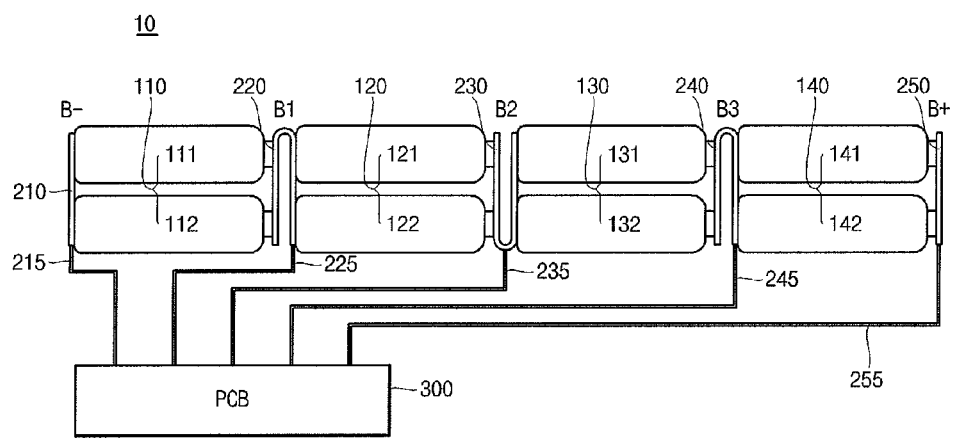
FIG. 1 illustrates a schematic view of the structure of a battery pack according to an embodiment.

Embodiments will now be described more fully hereinafter with reference to the accompanying drawings. However, embodiments may be in different forms and should not be construed as limited to the embodiments set forth herein. Rather, these embodiments are provided to convey the scope of the invention to those skilled in the art. Like reference numerals denote like elements throughout.

Hereinafter, a battery pack and a method of manufacturing the same in accordance with embodiments will now be described with reference to the accompanying drawings.

FIG. 1 illustrates a schematic view of the structure of a battery pack 10 according to an embodiment.

Referring to FIG. 1, the battery pack 10 may include first through fourth bare cell sets 110, 120, 130, and 140, first through fifth lead plates 210, 220, 230, 240, and 250, first through fifth tabs 215, 225, 235, 245, and 255, and a protective circuit module 300. The first through fourth bare cell sets 110, 120, 130, and 140 may include a plurality of bare cells 111, 112, 121, 122, 131, 132, 141, and 142.

Each of the bare cells 111, 112, 121, 122, 131, 132, 141, and 142 may include an electrode assembly (not shown), a can accommodating the electrode assembly, and a can assembly (not shown) coupled to an opening of the can accommodating the electrode assembly. Both sides of each of the bare cells 111, 112, 121, 122, 131, 132, 141, and 142 may have opposite polarities. In the illustrated embodiment, projection sides are positive electrodes, and flat sides are negative electrodes.

Each of the first through fourth, bare cell sets 110, 120, 130, and 140 may include a plurality of bare cells connected in parallel. Although each of the first through fourth bare cell sets 110, 120, 130, and 140 can include two bare cells connected in parallel as illustrated in FIG. 1, the number of bare cells connected in parallel may be three or more. Alternatively, each of the first through fourth bare cell sets 110, 120, 130, and 140 may include a single bare cell. Although the first through fourth bare cell sets 110, 120, 130, and 140 may be exemplified in FIG. 1, the number of bare cell sets may be two or more.

B+ and B− denote large current terminals and power parts on both ends of bare cells 111, 112, 121, 122, 131, 132, 141, and 142 connected in series-parallel. B+ is a positive power part, which denotes a highest potential terminal. B− is a negative power part, which denotes a lowest potential terminal. Thus, a negative terminal of the first bare cell set 110 can be the lowest potential terminal, and a positive terminal of the fourth bare cell set 140 can be the highest potential terminal.

The first lead plate 210 may be electrically connected to the negative terminal of the first bare cell set 110, for example, through welding, and the fifth lead plate 250 may be electrically connected to the positive terminal of the fourth bare cell set 140, for example, through welding. The first lead plate 210 may connect the bare cells 111 and 112 of the first bare cell set 110 in parallel, and the fifth lead plate 250 may connect the bare cells 141 and 142 of the fourth bare cell set 140 in parallel. The first and fifth lead plates 210 and 250 may have plate shapes and may be formed of metal having high electric conductivity, such as copper, nickel, and aluminum. The first lead plate 210 may be disposed at the lowest potential terminal B−, and the fifth lead plate 250 may be disposed at the highest potential terminal B+.

The second lead plate 220 may be disposed at a potential terminal B1 between the first and second bare cell sets 110 and 120, the third lead plate 230 may be disposed at a potential terminal B2 between the second and third bare cell sets 120 and 130, and the fourth lead plate 240 may be disposed at a potential terminal B3 between the third and fourth bare cell sets 130 and 140. Thus, the bare cell sets 110, 120, 130 and 140 may be connected in series-parallel. In this case, the second through fourth lead plates 220, 230, and 240 may be connected to the bare cell sets 110, 120, 130, and 140, for example, through welding. According to embodiment, welding protrusions (not shown) may be disposed at the second through fourth lead plates 220, 230, and 240 at welding positions of the bare cell sets 110, 120, 130, and 140. Each of the second through fourth lead plates 220, 230, and 240 may be bent at its middle part to form a U-shape, and may be formed of metal having high electric conductivity, such as copper, nickel, and aluminum. The second through fourth lead plates 220, 230, and 240 may be disposed at the potential terminals B1, B2, and B3, respectively.

The first through fifth tabs 215, 225, 235, 245, and 255 may be electrically connected to the first through fifth lead plates 210, 220, 230, 240, and 250, respectively. The first through fifth tabs 215, 225, 235, 245, and 255 may be electrically connected to pads (e.g., pads 313, 323, 333, 343, and 353 of FIGS. 3-9) on the protective circuit module 300. Thus, the first tab 215 may be electrically connected to the lowest potential terminal B− of the battery pack 10, and the fifth tab 250 may be electrically connected to the highest potential terminal B+ of the battery pack 10. That is, the potential terminals B−, B1, B2, B3, B+ of the battery pack 10 may increase in electric potential in order from the first tab 215 to the fifth tab 255.

The protective circuit module 300 may include a substrate (not shown), a protective circuit unit (not shown), a connector (not shown), and pads (e.g., pads 313, 323, 333, 343, and 353 of FIGS. 3 through 9).

The substrate may include a printed circuit board. A conductive metal pattern (not shown) may be disposed in the substrate. The substrate may be electrically connected to the pads, a protective circuit device, and the connector.

The protective circuit unit may be disposed at a surface of the substrate, and may check the charge/discharge state of a bare cell and information about current, voltage, and temperature of a battery to protect a battery pack.

The connector may be disposed at a side of the substrate to function as an electrical passage connected to an external device.

The pads may be disposed at a side of the substrate and may be electrically connected to the first through fifth tabs 215, 225, 235, 245, and 255, respectively. Hereinafter, the structures of the pads and a method of connecting the pads to the first through fifth tabs 215, 225, 235, 245, and 255 will be described.

Figure 2:
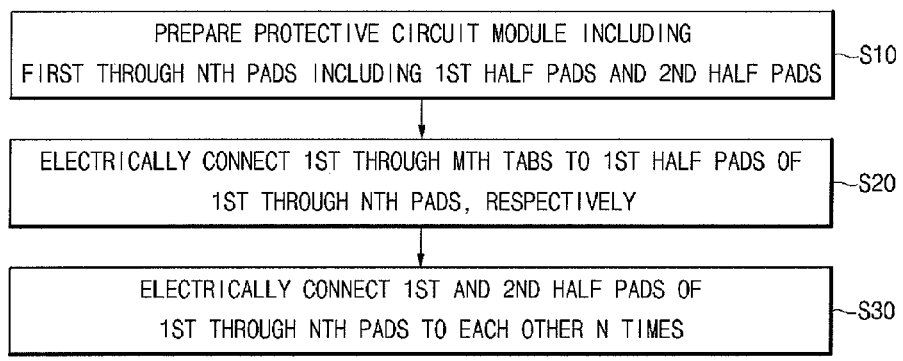
FIG. 2 illustrates a flow chart of a method of manufacturing a battery pack according to an embodiment.

FIG. 2 illustrates a flow chart of a method of manufacturing the battery pack 10 according to an embodiment. FIGS. 3 through 9 illustrate schematic views of a method of manufacturing a battery pack according to an embodiment.

Referring to FIG. 2, a method of manufacturing the battery pack 10 may include operations S10, S20, and S30. Operation S10 illustrates the preparation of a protective circuit module including first through Nth pads. Each of the first through Nth pads may include a first half pad and a second half pad. In operation S20, first through Mth tabs may be electrically connected to the first half pads of the first through Nth pads, respectively. In operation S30, the first and second half pads of the first through Nth pads are connected to each other N times.

Operation S10, which illustrates the preparation of the protective circuit module including the first through Nth pads and the first and second half pads, will now be described.

Figure 3:
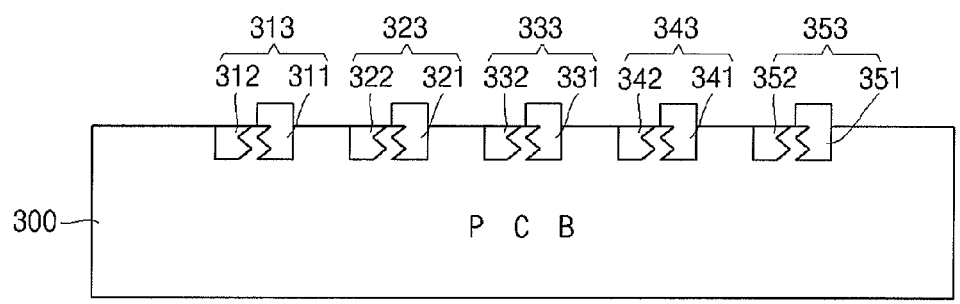
FIGS. 3 through 9 illustrate schematic views of a method of manufacturing a battery pack according to embodiments.

Referring to FIG. 3, operation S10 illustrates the preparation of the protective circuit module having an upper surface in which the first through Nth pads are disposed, in which N is a natural number that is greater, than 1. In the illustrated embodiment, N is 5 to exemplify the protective circuit module 300 provided with the first through fifth pads 313, 323, 333, 343, and 353.

The first pad 313 may include a first half pad 311 and a second half pad 312. The second pad 323 may include a first half pad 321 and a second half pad 322. The third pad 333 may include a first half pad 331 and a second half pad 332. The fourth pad 343 may include a first half pad 341 and a second half pad 342. The fifth pad 353 may include a first half pad 351 and a second half pad 352. According to embodiments, the first half pads 311, 321, 331, 341, and 351 are electrically separated from the second pads 312, 322, 332, 342, and 352. According to embodiments, the first half pads 311, 321, 331, 341, and 351 are electrically insulated from a conductive metal pattern in the protective circuit module 300. According to embodiments, the second half pads 312, 322, 332, 342, and 352 are electrically connected to the conductive metal pattern in the protective circuit module 300. The first half pads 311, 321, 331, 341, and 351 and the second pads 312, 322, 332, 342, and 352 may be formed of conductive material such as copper.

Operation S20, in which the first through Mth tabs are electrically connected to the first half pads of the first through Nth pads, will now be described.

Figure 4:
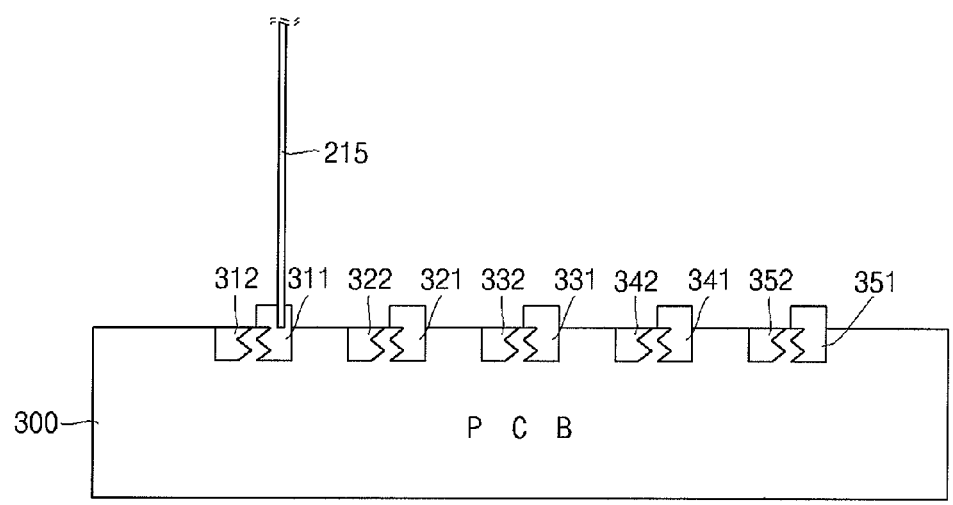
Figure 5:
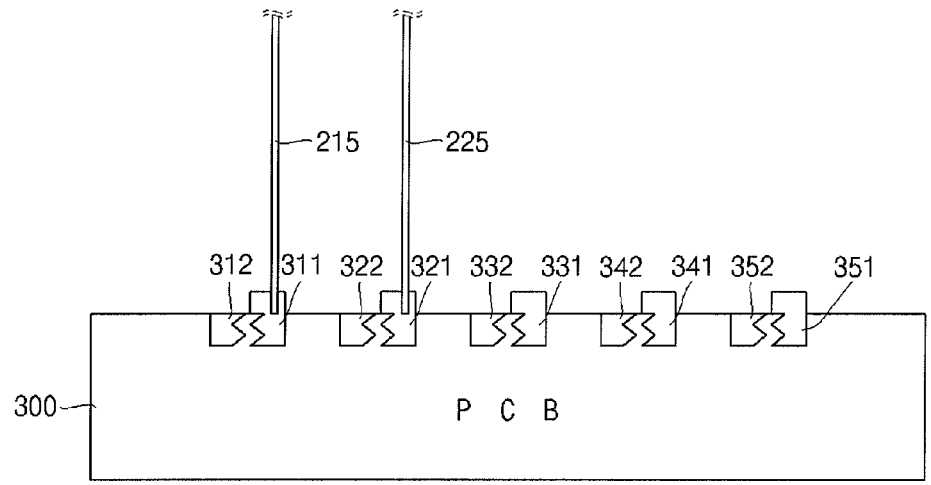
Figure 6:
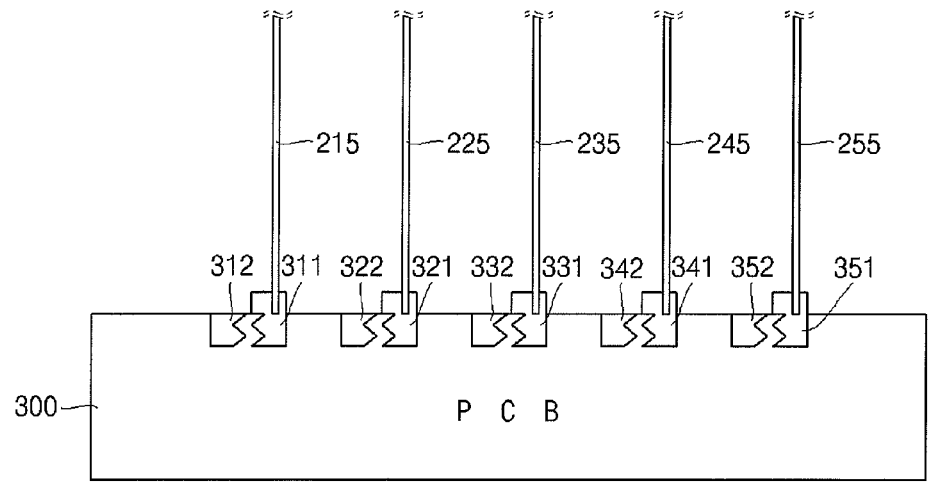

Referring to FIGS. 4 through 6, the first through Mth tabs may be electrically connected to the first half pads 311, 321, 331, 341, and 351, respectively. M is a natural number that is greater than 1. In the illustrated embodiment, M is 5 to correspond to the number of the tabs 313, 323, 333, 343, and 353. The first tab 313 may be electrically connected to the lowest potential terminal B− of the battery pack 10, and the fifth tab 353 may be electrically connected to the highest potential terminal B+ of the battery pack 10. That is, the potential terminals B−, B1, B2, B3 and B+ of the battery pack 10 may increase in electric potential in order from the first tab 215 to the fifth tab 255.

The first through fifth tabs 215, 225, 235, 245, and 255 may be electrically connected through resistance welding or laser welding to the first half pads 311, 321, 331, 341, and 351, respectively. In operation S20, the first half pads 311, 321, 331, 341, and 351 are electrically insulated from the conductive metal pattern in the protective circuit module 300 as described above. Thus, the first through fifth tabs 215, 225, 235, 245, and 255 may be electrically insulated from the protective circuit module 300. Although the first through fifth tabs 215, 225, 235, 245, and 255 may be sequentially connected to the first half pads 311, 321, 331, 341, and 351 in order from low electric potential to high electric potential, the first through fifth tabs 215, 225, 235, 245, and 255 may be non-sequentially connected to the first half pads 311, 321, 331, 341, and 351, regardless of the level of electric potential. Alternatively, the first through fifth tabs 215, 225, 235, 245, and 255 may be simultaneously connected to the first half pads 311, 321, 331, 341, and 351.

Operation S30, in which the first and second half pads of the first through Nth pads are electrically connected to each other N times, will now be described.

Figure 7:
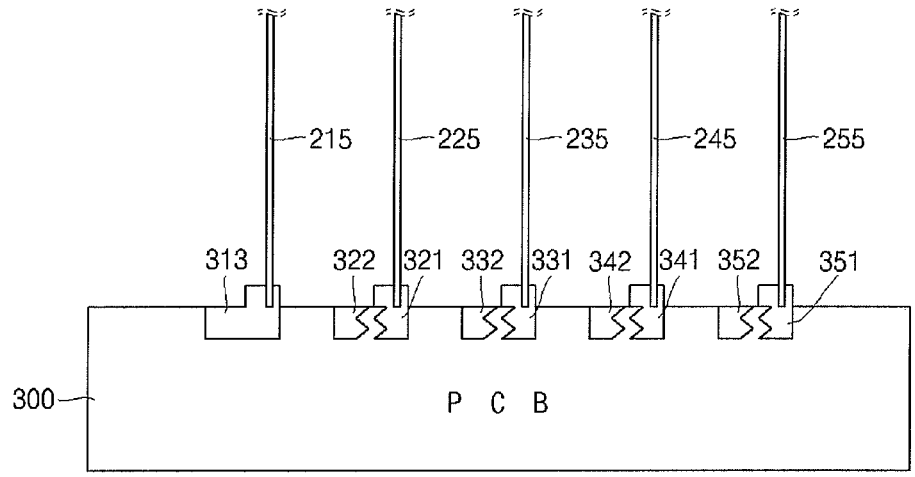
Figure 8:
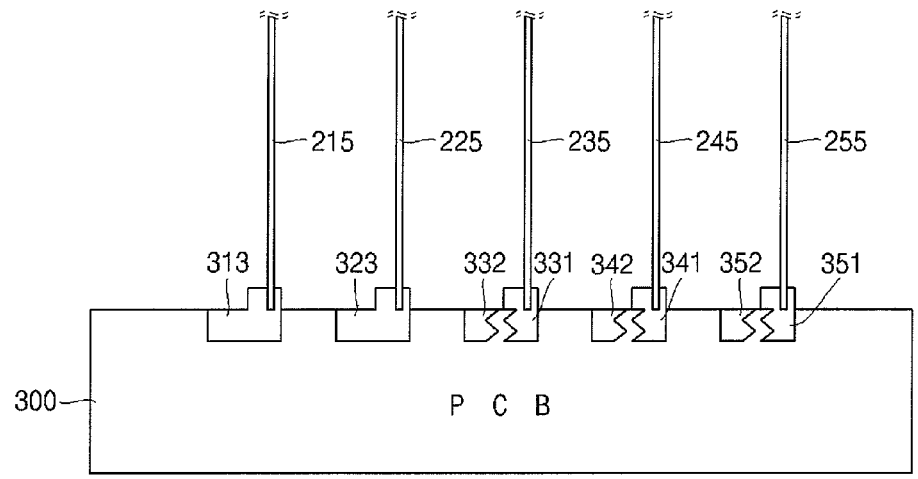
Figure 9:
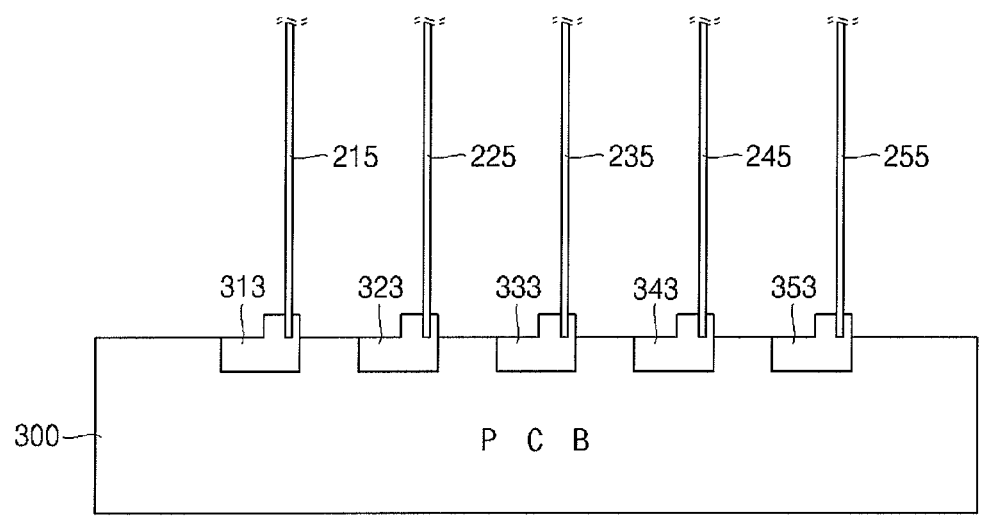

Referring to FIGS. 7 through 9, the first half pads 311, 321, 331, 341, and 351 may be electrically connected to the second half pads 312, 322, 332, 342, and 352, respectively, N times after the first through fifth tabs 215, 225, 235, 245, and 255 are connected to the first half pads 311, 321, 331, 341, and 351, respectively. In the illustrated embodiment, N is 5 and equal to the number of the first through fifth tabs 215, 225, 235, 245, and 255, and to the number of the first through fifth pads 313, 323, 333, 343, and 353.

The first half pads 311, 321, 331, 341, and 351 may be electrically connected to the second half pads 312, 322, 332, 342, and 352, for example, through soldering, but the electrical connection is not limited thereto.

In operation S30, the first half pads 311, 321, 331, 341, and 351 are sequentially connected to the second half pads 312, 322, 332, 342, and 352 in order from the first tab 215 to the fifth tab 255.

When a plurality of bare cell sets are connected to a protective circuit module through a plurality of tabs, the bare cell sets are connected to the protective circuit module in order, from the tab connected to a low potential terminal to the tab connected to a high potential terminal. If a tab connected to a high potential terminal is connected to a protective circuit substrate, and then a tab connected to a low potential terminal is connected to the protective circuit module, or if a tab connected to a high potential terminal and a tab connected to a low potential terminal are simultaneously connected to a protective circuit module, the protective circuit module cannot sequentially receive preset signals of potential terminals. This may damage the protective circuit module, particularly, a protective circuit unit of the protective circuit module. To prevent this damage, tabs according to embodiments are connected to a protective circuit module in order from a low potential terminal to a high potential terminal.

According to an embodiment, the first through fifth tabs sequentially connected from the lowest potential terminal B− to the highest potential terminal B+ may be non-sequentially connected to the first half pads, regardless of the level of electric potential. Alternatively, the first through fifth tabs may be simultaneously connected to the first half pads. Since the first half pads are electrically insulated from the conductive metal pattern in the protective circuit module, the first through fifth tabs are electrically connected to the first half pad, but cannot transmit an electrical signal to the protective circuit unit. Thus, when the first through fifth tabs are sequentially connected to the pads of the protective circuit module, non-sequential or simultaneous connecting operation can be performed without the level of electric potential to improve process efficiency.

Thereafter, the first half pads may be respectively and sequentially connected to the second half pads, in order from the first tab to the fifth tab, for example, through soldering.

In addition, the pads of the battery pack according to embodiments may be disposed on the upper surface of the protective circuit module. Thus, a simpler process can be performed than a process of welding tabs through holes of a protective circuit module.

In a battery pack and methods of manufacturing the same in accordance with the embodiments, the lead plates may be connected to the pads disposed in the protective circuit module to simplify a process and improve efficiency of the process.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack comprising:

a plurality of bare cells; and a protective circuit module defining a first surface electrically connected to the bare cells, wherein the protective circuit module includes N pads, wherein each pad comprises a first half pad and a second half pad positioned adjacent to each other on the first surface of the protective circuit module so that the first half pad and the second half pad are co-planar and are spaced apart from each other so that a portion of the first surface of the protective circuit module is interposed between the first and second half pads which defines a gap, N is a natural number that is greater than 1, and the first half pad is electrically connected to the second half pad wherein the first and second half pads are formed of copper and each define a zig-zag edge that is separated by the surface of the protective circuit module so that the location of the gap between the first and second half pads is displaced across the width of the pad; and a plurality of leads plates that interconnect the plurality of cells to the plurality of first half pads; and a plurality of connectors made of solder that interconnect the plurality of first half pads to the adjacent plurality of second half pads so as to extend between the zig-zag edges wherein the plurality of connectors are deposited onto the portion of the first surface of the protective circuit module that is interposed between the first and second half pads.

2. The battery pack as claimed in claim 1, wherein first through $N^{th}$ pads are disposed on an upper surface of the protective circuit module.

3. The battery pack as claimed in claim 1, wherein the first half pads of the first through $N^{th}$ pads are electrically connected to second half pads of the first through $N^{th}$ tabs, respectively.

4. The battery pack as claimed in claim 3, wherein the first through $N^{th}$ tabs are electrically connected to lead plates configured to connect the bare cells.

5. The battery pack as claimed in claim 1, wherein the first half pad is electrically insulated from a conductive metal pattern in the protective circuit module.

6. The battery pack as claimed in claim 1, wherein the second half pad is electrically connected to a conductive metal pattern in the protective circuit module.

7. The battery pack as claimed in claim 3, wherein the first half pads are connected to the first through $M^{th}$ tabs through one of a resistance welding operation and a laser welding operation.

8. The battery pack as claimed in claim 1, wherein the first half pad is connected to the second half pad through a soldering operation.

9. The battery pack as claimed in claim 1, wherein each first half pad is connected to each second half pads by one of the plurality of connectors.

* * * * *